United States Patent Office 3,770,751
Patented Nov. 6, 1973

3,770,751
PROCESS FOR PREPARING NITRO SUBSTITUTED PICOLINONITRILES
Paul L. Anderson, Center Grove Road, Dover, N.J. 07801
No Drawing. Filed Dec. 13, 1971, Ser. No. 207,558
Int. Cl. C07d 31/46
U.S. Cl. 260—294.9     3 Claims

ABSTRACT OF THE DISCLOSURE

Nitro substituted picolinonitriles, in particular 3-nitro-picolinonitrile, have been found to be useful as anti-microbial agents.

---

This invention relates to the use of nitro substituted picolinonitriles as anti-microbial agents. The invention also relates to anti-microbial compositions containing nitro substituted picolinonitriles as an active ingredient thereof. This invention further relates to a novel method for preparing 3-nitro-picolinonitrile.

The active agents with which this invention is concerned may be represented by the following structural formula:

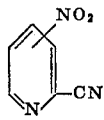

and pharmaceutically acceptable acid addition salts thereof.

The compounds of Formula I above are known and may be prepared according to methods disclosed in the literature from known materials. The compound of Formula I in which the nitro group is in the 3-position may be prepared by the following novel reaction scheme:

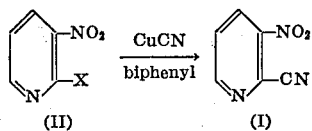

where X is chlorine.

The compounds of Formula I are prepared by heating the compound of Formula II in the presence of cuprous cyanide and biphenyl at the melting point of the reactant mixture. The temperature of the melting point is not critical and will vary, but it is preferred that the reaction be run in excess of 200° C. The time also is not critical, but for optimum results it is preferred that the heating be continued for a period in excess of 3 hours or more after the melting point is reached. The product is isolated by conventional techniques, e.g., extraction and chromatography.

The compounds represented by Formula I above are useful as anti-microbial agents as indicated in conventional serial dilution tests by their activity at concentrations of 1 to 100 micrograms per milliliter in vitro against the organisms below. The lowest inhibiting concentration range for the compounds of Formula I for each organism is shown in the right hand column.

| Organisms: | Dosage (mg./ml.) |
|---|---|
| Haem. *Escherichia coli* | 1.25–12.5 |
| *Pseudomonas* species | 25–100 |
| *Proteus vulgaris* | 6.25–12.5 |
| *Salmonella typhimurium* | 1.25–12.5 |
| *Staphylococcus aureus* SG 511 | 3.12–12.5 |
| B-haem. *Streptococcus* Lancefield Group A | 1.25–6.25 |
| *Streptococcus faecalis* | 25–50 |
| *Candida albicans* (124) | 50 |
| *Escherichia coli* 04 | 1.25–12.5 |
| *Escherichia coli* D 10 | 1.25–12.5 |
| *Proteus mirabillis* | 10–25 |
| *Proteus vulgaris* SFI-Nr. 57 | 12.5–25 |
| *Proteus vulgaris* SFI-Nr. 58 | 10–25 |
| *Pseudomonas fluorescens* | 100 |
| *Aerobacter aerogenes* | 1.25–25 |
| *Salmonella heidelberg* | 1.25–25 |
| *Klebsiella* sp. | 1.25–25 |
| *Klebsiella pneumoniae* | 1.25–25 |
| *Shigella flexneri* | 1.25–12.5 |
| *Micrococcus oxford* | 1.25–6.25 |
| *Staphylococcus albus* 5226 | 5–6.25 |
| *Staphylococcus aureus* Smith | 2.5–5 |
| *Staphylococcus aureus* ATCC 10390 | 5–10 |
| *Staphylococcus aureus* ATCC 14154 (pen-res) | 3.12–6.25 |
| *Streptococcus aronson* | 100 |
| *Strepococcus lactis* | 50–100 |
| *Corynebacterium equi* | 3.12–12.5 |
| Erysipelothrix | 10–12.5 |
| *Andida albicans* (42) | 50 |
| *Escherichia coli* (120) | 1.25–12.5 |

For such usages, compounds (I) may be administered orally, parenterally or topically as such or admixed with conventional pharmaceutical carriers. They may be administered orally in such forms as tablets, dispersible powders, granules, capsules, syrups and elixirs; parenterally as solutions, suspensions, dispersions, emulsions, and the like; e.g., a sterile injectable aqueous suspension and topically as tinctures, ointment or creams. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc; granulating and disintegrating agents, e.g., starch and alginic acid; binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and, thereby, provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain, e.g., calcium carbonate, calcium phosphate and kaolin. The injectable compositions are formulated as known in the art and may contain appropriate dispersing or wetting agents and suspending agents identical or similar to those mentioned above. Topical formulations are also prepared by methods well known in the art and the active ingredient may be dissolved or dispersed in water, alcohol, oils, and waxes along with other ingredients such as dispersing agents, stabilizers, fragrances, coloring agents and the like commonly used in tinctures, ointments and creams. These pharmaceutical preparations may contain up to about 90% of the active ingredient in combination with the carrier or adjuvant.

Furthermore, the compounds of Formula I may be similarly administered in the form of their non-toxic pharmaceutically acceptable acid addition salts. Such salts possess the same order of activity as the free base, are readily prepared by reacting the base with an appropriate acid and, accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, maleate, malate, tartrate, methane-sulfonate, cyclohexylsulfamate and the like.

Although the anti-microbial effective dosage utilized will vary depending upon the compound employed and the mode of administration, in general, satisfactory results are obtained when these compounds are administered orally or parenterally for systemic use at a daily dosage of about 4 mg. to about 200 mg. per kilogram of animal body weight. This daily dosage is preferably administered 2 to 4 times a day, or in sustained release form. For most large mammals in need of said treatment the total internal daily dosage is from about 250 mg. to about 2.5 gms. Dosage forms suitable for internal use comprise about 62.5 milligrams to about 1250 milligrams of active compound in intimate admixture with a solid or liquid pharmaceutically acceptable carrier or diluent.

The preferred pharmaceutical compositions from the standpoint of preparation and ease of administration are tinctures, ointments, and creams used in topical administration containing from about 0.5 to 30% preferably 0.5 to 10% by weight of the active ingredient.

EXAMPLES 1 AND 2

Tablets and capsules suitable for oral administration

Tablets and capsules containing the ingredients indicated below may be prepared by conventional techniques and are useful as anti-microbial agents at a dose of one tablet or capsule 2 to 4 times a day.

| Ingredient | Weight (mg.) Tablet | Capsule |
| --- | --- | --- |
| 3-nitro-picolinonitrile | 100 | 100 |
| Tragacanth | 10 | |
| Lactose | 197.5 | 250 |
| Corn starch | 25 | |
| Talcum | 15 | |
| Magnesium stearate | 2.5 | |
| Total | 300 | 300 |

Similar tablets and capsules are prepared using 4-nitro-picolinonitrile in place of the 3-nitro-picolinonitrile above.

EXAMPLES 3 AND 4

Sterile suspension for injection and oral liquid suspension

The following pharmaceutical compositions are formulated with the indicated amount of active agent using conventional techniques. The injectable suspension and oral liquid suspension represent formulations useful as unit doses and may be administered as anti-microbial agents. The injectable suspension is suitable for administration twice a day whereas the oral liquid suspension is suitably administered 2 to 4 times per day for this purpose.

| Ingredients | Weight (mg.) Sterile injectable suspension | Oral liquid suspension |
| --- | --- | --- |
| 3-nitro-picolinonitrile | 125 | 150 |
| Sodium carboxy methyl cellulose, USP | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | q.s. |
| Color | | q.s. |
| Methyl paraben, USP | | 4.5 |
| Propyl paraben, USP | | 1.0 |
| Polysorbate 80 (e.g. Tween 80), USP | | 5 |
| Sorbitol solution, 70%, USP | | 2,500 |
| Buffer agent to adjust for desired stability | q.s. | q.s. |
| Water | (1) | (2) |

1 For injection q.s. to 1 ml.
2 Q.s. to 5 ml.

Sterile injectable suspensions and oral liquid suspensions are similarly prepared using 4-nitro-picolinonitrile in place of the 3-nitro-picolinonitrile above.

EXAMPLE 5

Ointment for topical treatment

A water insoluble ointment for the topical treatment of anti-microbial infection is prepared using conventional methods according to the following formulation:

| | Weight (g.) |
| --- | --- |
| Cholesterol | 30 |
| Stearyl alcohol | 30 |
| White wax | 80 |
| White petrolatum | 860 |
| 3-nitro-picolinonitrile | 90 |

Similarly, the above ointment is prepared using 4-nitro-picolinonitrile in place of the above 3-nitro-picolinonitrile.

EXAMPLE 6

Water soluble ointment

A water soluble ointment for treatment of topically disposed anti-microbial infection is prepared by standard techniques according to the following techniques:

| | Weight (g.) |
| --- | --- |
| Polyethylene glycol (M.W. 4000) | 4000 |
| Polyethylene glycol (M.W. 400) | 800 |
| 3-nitro-picolinonitrile | 100 |

A similar ointment is prepared using 4-nitro-picolinonitrile in place of the 3-nitro-picolinonitrile above.

EXAMPLE 7

Cream for topical application

A cream preparation for topical application of the active agent indicated below is prepared according to the following formulation using conventional techniques:

| | |
| --- | --- |
| Cetyl alcohol, grams | 9.2 |
| Stearyl alcohol, grams | 9.2 |
| Sodium lauryl sulfate, grams | 1.5 |
| White petrolatum, ml. | 30.0 |
| Propylene glycol, ml. | 10.0 |
| Distilled water to make total of, grams | 100.0 |
| 3-nitro-picolinonitrile (grams) | 10 |

A similar cream is prepared using 10 grams of 4-nitro-picolinonitrile in place of the above 3-nitro-picolinonitrile.

EXAMPLE 8

Preparation of 3-nitro-picolinonitrile

A mixture of 15.4 g. of 2-chloro-3-nitro-pyridine, 10.4 g. of cuprous cyanide and 27.8 g. of biphenyl is heated to form a melt at 205° C., and the melt is maintained at this temperature for 3½ hours. It is then poured into a mortar and pulverized and extracted with acetone. The acetone extracts are then poured into a stirred solution of 6 N hydrochloric acid (HCl) solution and the solid which forms is filtered and washed with 2 N HCl. The HCl solutions are combined, diluted with an equal volume of water and the solid filtered. The filtrate is extracted with methylene chloride, and the organic layer is separated, dried, and evaporated yielding 6.56 g. of a solid M.P. 77–87° C. The solid is chromatographed on a silica gel column to obtain 1.56 g. (11%) of 3-nitro-picolinonitrile, M.P. 75–78° C.

What is claimed is:

1. A process for preparing a compound of the formula

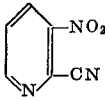

which comprises heating a compound of the formula

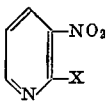

where X is chlorine with cuprous cyanide in the presence of biphenyl at the melting point of the reactant mixture.

2. A process according to claim 1 which is carried out at a temperature in excess of 200° C.

3. A process according to claim 1 wherein the heating is continued for a period in excess of 3 hours after the melting point is reached.

References Cited

UNITED STATES PATENTS 2,195,076   3/1940   Braun et al. ......... 260—465

OTHER REFERENCES

Elderfield: Heterocyclic Compounds, vol. I, Wiley, pp. 559–60 (1950).

Klingsberg: Pyridine and Its Derivatives, part 3, Interscience Pub., pp. 230–231 (962).

Craig, J.: Am. Chem. Soc., vol. 56, pp. 231–32, January 1934.

ALAN L. ROTMAN, Primary Examiner

U.S. Cl. X.R.

424—263

UNITED STATES PATENT OFFICE
CERTIFICATE OF CORRECTION

Patent No. 3,770,751          Dated November 6, 1973

Inventor(s) Paul L. Anderson

It is certified that error appears in the above-identified patent and that said Letters Patent are hereby corrected as shown below:

On the cover sheet, in the heading, line 5 after "07801" insert -- Assignor to Sandoz-Wander, Inc., Hanover, New Jersey --.

Signed and sealed this 25th day of June 1974.

(SEAL)
Attest:

EDWARD M. FLETCHER, JR.　　　　　　　C. MARSHALL DANN
Attesting Officer　　　　　　　　　　 Commissioner of Patents